April 9, 1946.　　　　J. W. ALLEN　　　　2,397,938
REVERSE CURRENT RELAY FOR D.C. GENERATOR BATTERY SYSTEMS
Filed Dec. 9, 1944
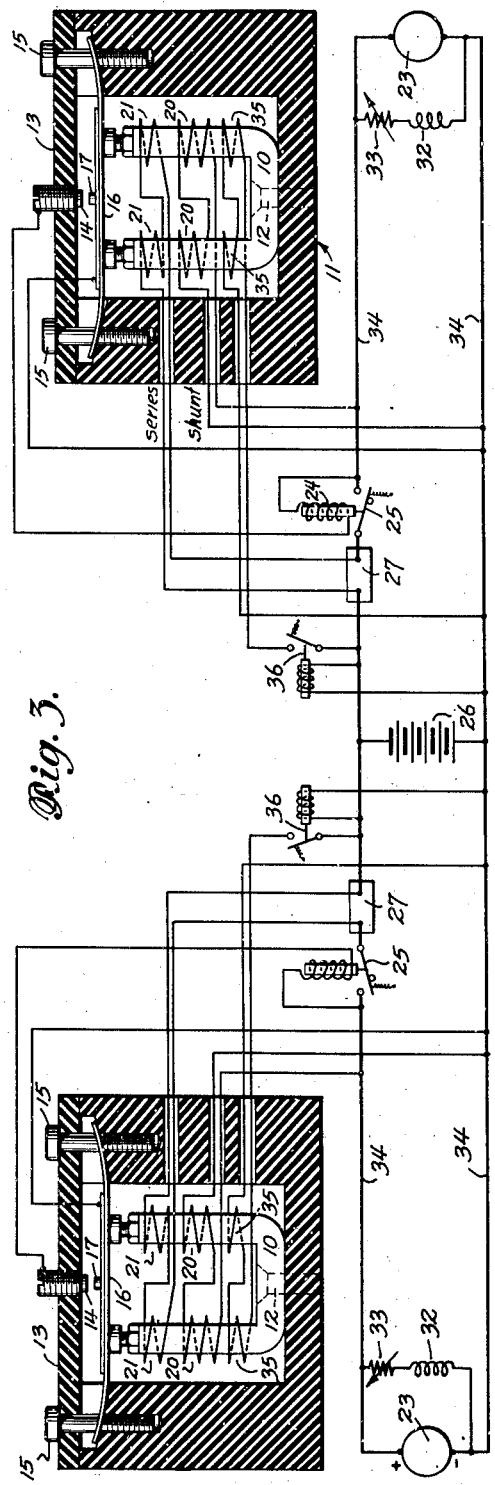
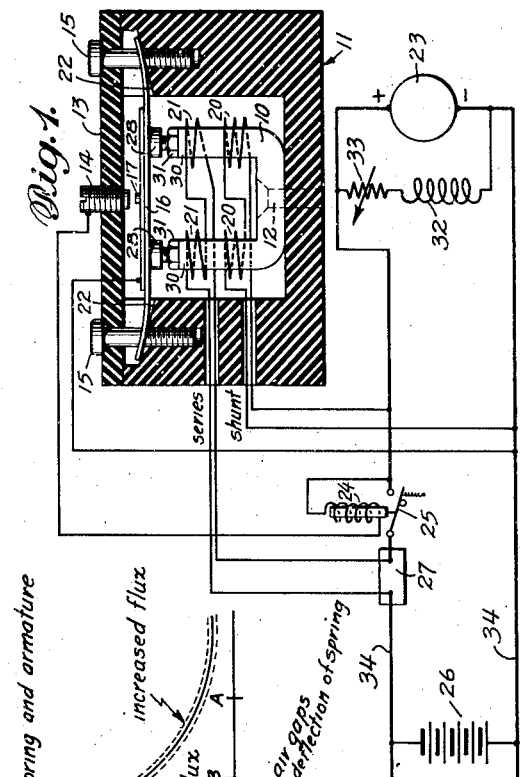
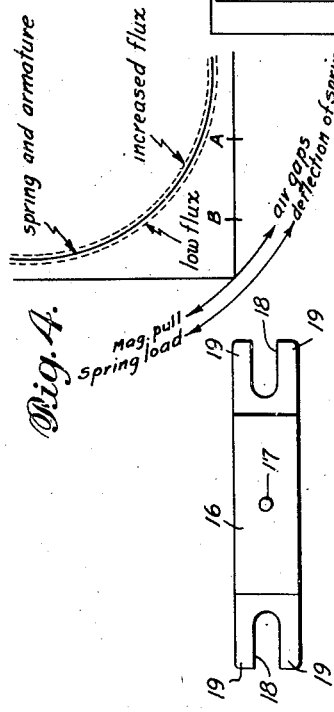
Inventor
Joseph W. Allen,
By
Attorney Patented Apr. 9, 1946

2,397,938

UNITED STATES PATENT OFFICE 2,397,938

REVERSE CURRENT RELAY FOR DIRECT CURRENT GENERATOR BATTERY SYSTEM

Joseph W. Allen, Washington, D. C.

Application December 9, 1944, Serial No. 567,503

4 Claims. (Cl. 320—33)

(Granted under the act of March 3, 1883, as amended April 30, 1928; 370 O. G. 757)

This invention relates to a relay for use in D. C. generator battery systems and has for an object to provide a relay between the generator and the battery which will permit current to pass from the generator to the battery when the battery is being recharged, but which will prevent current flowing in reverse from the battery to the generator under all conditions, thus preventing accidental discharge or draining of the battery through the generator.

At the present time, for D. C. generator-battery systems, as are employed for aircraft and other installations, wherein a D. C. generator is employed in conjunction with a storage battery to provide electrical power, a reverse current relay is utilized to automatically connect the generator to the battery, when the voltage generated by the generator is of the proper value to charge a storage battery, and automatically disconnect the generator from the battery, when the generator voltage is less than that of the battery, tending to cause current to flow from the battery through the generator in the so termed "reverse" direction. In such a device an iron core and movable arm is present wherein a magnetic flux is produced by current flowing through a voltage coil on the magnetic core, energized by the voltage of the generator, which exerts a pull on the movable armature and, overcoming a spring tension, closes a circuit, permitting current to flow from the generator to the battery. In case of reverse current flow, the flux produced by the reverse current flowing through a series coil, positioned on the same magnetic core as the voltage coil energized by the voltage of the generator, produces a flux which "bucks" the voltage coil flux and in reducing the total flux existing in the magnetic core, reduces the pull on the armature to a value that allows the tension spring to move the armature away from the magnetic core and opens the circuit between generator and battery, automatically preventing a discharge of the battery through the generator circuit whenever the generator is generating a voltage insufficient to properly charge its associated battery.

In the presently employed reverse current relays, the magnetic flux in the magnetic core and movable armature is a function of generator voltage and of line current. In such a relay, with no voltage being generated by a generator, if the contacts are closed inadvertently, as a result of vibration or by manual means, the current flowing through the series coil can produce sufficient flux in the magnetic core and movable armature to hold the circuit closed, since the pull between armature and magnetic core is produced by the total lines of magnetic force existing and is not responsive to direction (polarity) of the lines of force.

What is proposed herein is a device in which magnetic flux exists by virtue of a permanent magnet, and such magnetic flux, by acting on an associated movable armature tends to keep the circuit, or circuit controlling contacts, open.

A further object of this invention is to provide a relay permitting charging of a storage battery from a single generator or a multiplicity of generators and preventing discharge of the battery through any one of the generators, even though in the case of a multiplicity of generators the voltage of one of the generators may be above that of the battery, while the voltage of another of the generators is below that of the battery.

With the foregoing and other objects in view, the invention consists in the construction, combination and arrangement of parts hereinafter set forth, claimed and illustrated in the drawing in which:

Fig. 1 is a schematic view of the relay for a single battery and single generator.

Fig. 2 is an elevational view of the armature used in the relay.

Fig. 3 is a view similar to Fig. 1 as modified for multiplicity of generators and Fig. 4 is a graph showing the operation.

There is shown at 10 a permanent magnet consisting of a U-shaped member held to a body member 11 by a screw 12. For purposes of simplicity of explanation, the body member 11 is a non-conductor, as is bridge member 13, supporting a contact 14. The bridge member 13 is assembled to body 11 by screws 15. The movable armature 16, carrying a contact 17, is positioned by the slots 18 of armature 16 co-acting freely with the assembly screws 15.

On the permanent magnet flux body, or core path, are provided a voltage, or shunt, winding 20 and a current, or series, winding 21. The voltage, or shunt, winding 20 is so connected to a generator 23 that when the voltage, or shunt, winding 20 is energized by the voltage of the generator 23, the magnetomotive force produced by the voltage winding 20 "bucks" or reduces the magnetomotive force of the permanent magnet 10, reducing the quantity of flux passing through the movable armature 16, and thus reduces the pull between magnet 10 and armature 16.

The movable armature 16 is a relatively thin, flat piece, and when under the pull of the magnet member 10 is attracted thereto. The ends 19 of the armature 16 rest on inclined surfaces or slopes 22 of the body member 11. As the central portion of armature 16 is attracted to magnet 10, the ends 19 of armature 16, being more flexible, deflect and conform to the slope 22. In this manner, as the armature 16 is moved from its outermost position, where only its ends 19 contact the slope 22, toward magnet 10, the distance between points of contact on slope 22 decreases and in effect the portion of the flat plate armature 16, subject to bending, decreases in length and becomes stiffer.

This deflection force condition is desirable, since the pull produced by the magnet 10 on the armature 16 increases in greater proportion than the linear reduction of the gap. If the gap is made ½ of a former position, the flux passing through the gap is doubled and the pull is quadrupled. Since the ends 19 of the armature 16, which contact slope 22 are more flexible, the movement of armature 16 towards magnet 10 produces most of the bending at the ends of the armature 16 which contact the slope 22. The ends 19 of armature 10, subject to bending, therefore, may be considered as a beam, which, with an increase of deflection, also becomes shorter in length, but along a slope or bevel so proportioned as to require four times the pull to cause a unit deflection at a short gap than at a gap twice as great. For instance: since the deflection Y of a shallow beam, with ends free and loaded at the center equals $$\frac{\text{Load} \times (\text{length})^3}{K}$$

a 10" beam with a 20 lb. load will result in a deflection Y (page 438, Marks Handbook, Second Edition, McGraw Hill Book Company, New York). If now the load is raised to 80 lbs. then the length at which the new load will cause the same unit deflection, may be obtained from the relation $$20\# \times (10)^3 = 80\# \times \text{length}^3$$

and $$\text{length}^3 = \frac{20}{80} \times 10^3 = \frac{10^3}{4}, \text{ hence, length} = 6.3'' \text{ approx.}$$

In this relation of magnetic gap-pull and mechanical force-deflection, a desirable condition results, in that, as the pull increases the resistance to bending increases in relatively like ratio. The result is that at all gap positions only a slight change in total flux will cause a relatively large movement of the armature 10. With a small gap, as soon as the flux is reduced, the armature 10 will move and close the contacts 14 and 17 and then a slight increase in flux will exert sufficient pull on the armature 16 to open the contacts 14 and 17.

In the graph in Fig. 4, with short gap B and increased flux, the armature will not be released. As flux is lowered, its pull is decreased and the spring moves to long gap position A where contacts are located. At long gap A, a slight increase in flux exerts a pull overpowering the spring resistance and the armature 16 is pulled to a position B. It is not intended to provide such a relation throughout the entire possible gap, but only in the range required for proper contact separation. A shifting of the spring resistance and magnet gap pull characteristics may be also utilized for modifying the action.

The operation of the device is essentially as described herein. The shunt coil 20 is shown connected across the potential of a D. C. generator 23, a shunt field 32 and a manually, or automatically variable field resistor 33. For purposes of description, it is assumed that the voltage is automatically controlled. The series coil of the device may be energized from a line current shunt 27, or by turns carrying full line current as may be most desirable for a given generator rating.

With the shunt coil 20 and series coil 21 unenergized, the permanent magnet 10 attracts the armature 16 and maintains contacts 14 and 17 separated. The shunt coil 20 is so connected to the generator 23, electrically, that when energized its magnetomotive force is opposed to that of the permanent magnet 10, and since the flux passing through the gap is decreased, the armature 16 moves away from the magnet 10. The shunt coil 20, spring gradient, and air gap between magnet 10 and armature 16 are so proportioned that when the desired voltage is generated, sufficient to cause current to flow from the generator to the battery, the flux is decreased to a value permitting contacts 14 and 17 to close, energizing coil 24 of a contactor and closes the switch 25. The series coil 21 is so connected, that when current is flowing from the generator 23 to the battery 26, its magnetomotive force is in the same direction as that of the shunt coil 20, thus increasing pressure between contacts 14 and 17. The permanent magnet 10 is of such length and material that the demagnetization caused by the shunt coil 20, and series coil 21, the latter even at overload conditions of the generator 23, does not materially affect the residual magnetism or coercive force of the permanent magnet 16.

When the generator voltage decreases to a value where current begins to flow from the battery 26 (or bus line 34, in a multi-generator paralleled system) the magnetomotive force of the series coil 21 adds to the magnetomotive force of magnet 10 and attracts the armature 16 with a pull greater than the resistance of the flexible ends 19, thus causing armature 16 to move toward the magnet 10 and separate the contacts 14 and 17. The separation of contacts 14 and 17 opens switch 25, thus interrupting the flow of current from the line to and through the generator 23.

It will be readily seen, therefore, that the permanent magnet 10 holds contacts 14 and 17 open when the coils are un-energized. Upon energizing of coil 21, it weakens the magnet 10 and allows contacts 14 and 17 to close. When coil 21 is energized by a potential at 27, due to current flowing from generator to battery, the magnet 10 is weakened, allowing contacts 14 and 17 to be held more firmly together. When the shunt potential 27 for the coil 21 is a result of current flowing from battery 26, or bus line 34, to generator 23, the coil 21 strengthens the magnet 10, opening the contacts 14 and 17. The operation of the above-described reverse current relay is positive in that the flux can never reverse and cause the relay contacts 14 and 17 to close when excessive reverse currents flow.

In order to obtain a certain degree of adjustment of the gap pull without extreme accuracy in manufacture, and for purposes of adjustment, the U-shaped magnet member 10 is provided with adjustable pole ends, as shown, wherein the tips 28 can be screwed in or out of the pole piece ends 30, and locked in position with nuts 31.

Other means for varying the gap may be provided, a variable gap being extremely advantageous and desirable from the manufacturing viewpoint.

In order to more precisely govern the operation of a reverse current relay when two or more generators are employed, in parallel, to supply the power for required loads, it is desirable to employ a means responsive to such condition. The voltage of a battery on open circuit is an appreciable amount below that of a generator when charging the battery. A lead acid battery, for example, of 12 cells would have an open circuit voltage of approximately 26.5 volts. A generator to charge such a battery would be held automatically, as is done in the majority of aircraft, by a voltage regulator at a voltage of, for example, 28.0 volts. The figures stated are used merely to indicate the range of voltages of the bus of a single generator-battery combination.

When two or more generators are operating with a battery and bus system, if the voltage of one generator is reduced, the bus potential remains at approximately 28.0 volts, being maintained by the remaining generators. In this case, the reverse current will flow into the generator of decreasing voltage, from a potential of 28.0 volts, rather than from approximately 26.5 volts, as would be the case with only a battery on the bus. It is, therefore, possible to have a reverse current relay open the switch 25 of a generator because of reverse current, but since the generator potential has fallen but slightly below bus potential, it is higher than the potential of approximately 27.0 volts, for which such a relay would be adjusted to close in a single generator-battery system. The coil 20 of Figure 1 would weaken the magnet sufficiently to cause the contacts to close. The generator voltage being below that of the bus line 34, reverse current would flow through coil 21 causing it to open the contacts 14 and 17 and the cycle would repeat until the generator voltage decreased to a value where energization of coil 21 was insufficient to prevent magnet 10 from keeping contacts 14 and 17 open. To prevent such "chattering" of the reverse current relay, a coil, or winding, 35 is added to the magnet member 10, as shown in Figure 3.

The coil, or winding, 35 energized, would establish a magnetomotive force, because of its electrical connections, which would oppose the magnetomotive force produced by voltage, or shunt, coil 20. The coil 35 has a magnetomotive force which is a fractional part of the magnetomotive force produced by voltage or shunt winding 20. For purposes of description, if the voltage winding 20 has a magnetomotive force of 27 units, when the armature 16 is released and contacts 14 and 17 closed, with only a battery on the bus line 34, it must also have 27 units when a generator is on the bus line, but at the higher bus voltage.

If coil winding 35 has a magnetomotive force of 1 unit at the same time that voltage, or shunt, winding 20 has 27 units at a closing voltage of 27.0 volts, the result is 26 units of magnetomotive force acting on the magnetomotive force of permanent magnet 10 and armature 16 is not released. To provide the 27 units, when coils 20 and 35 are simultaneously energized, the generator voltage must be increased to produce more current in voltage winding 20, and hence, higher magnetomotive units. If the voltage is raised to 28.0 volts to produce 28 units in coil 20, and coil 35 is producing 1 unit, the resultant is 27 units and armature 16 is released.

Obviously, it is not desirable to have coil 35 energized when only a battery is on the bus line 34, but it is desirable to have it energized when the bus line voltage is higher, as when a generator is already charging a battery in a multigenerator system. To provide energization of coil 35, when a generator is on the line and non-energization of coil 35, when only a battery is on the line, there is provided a voltage-operated contactor 36, Figure 3, which, for example, is adjusted to close and open at approximately 27.3 volts, or substantially midway between 26.5 volts, when only a battery is on the line, and 28.0 volts when a generator is on the line. It will readily be seen, therefore, that the coil, or winding, 35 is not energized when a battery alone is on the bus line 34, but will be energized at the higher voltage when a generator is on the bus line 34. With such a winding 35, and a voltage actuated contactor 36, there is provided automatically a low, and proper, closing and opening voltage for the reverse current relay when only a battery is on the bus and a higher, and proper, closing and opening voltage for the same reverse current relay when a generator is on the bus, with the battery, establishing a higher bus voltage.

Other modifications and changes in the number and arrangement of the parts may be made by those skilled in the art without departing from the nature of this invention, within the scope of what is hereinafter claimed.

The invention herein described and claimed may be manufactured and used by or for the Government of the United States of America for governmental purposes without the payment of any royalties thereon or therefor.

What is claimed is:

1. A relay permitting passage of direct current from a generator to a storage battery and preventing reverse passage of current from the battery to the generator, said relay including a permanent magnet, a circuit between the charging generator and the storage battery to be charged, a switch in said circuit, means normally urging said switch to open said position, an electromagnet for closing said normally opened circuit switch, said electromagnet being in a circuit across said generator, a pair of contacts in said electromagnet circuit, an armature on which one of said contacts is mounted, said armature being adapted to bridge the poles of said permanent magnet and be held by said permanent magnet with the said contacts in spaced apart position, said armature having flexible ends yieldably urging said armature away from said electromagnet toward contact closing position, a shunt coil across said generator and about said electromagnet bucking the flux of said magnet, and a series coil across a potentiometer in the generator battery circuit aiding said magnet flux whereby when the generator voltage is above the battery voltage, the magnet flux is weakened, permitting said armature to close the contacts and maintain said switch in closed circuit position, and when voltage of said generator is below voltage of said battery, the magnet flux is strengthened by said series coil to separate said contacts and break the circuit from the battery to the generator.

2. A relay permitting passage of direct current from a generator to a storage battery and preventing reverse passage of current from the battery to the generator, comprising a circuit connecting the generator and the storage battery, a switch in said circuit, said switch including a pair of contacts, an armature on which one of said contacts is mounted, said armature being yieldably mounted tending to move its contact toward circuiting completing position, a permanent magnet normally holding said armature and its contact in circuit-interrupting position, a shunt coil across the generator and about said permanent magnet wound to normally buck the flux of the magnet to release the contact-carrying armature, a series coil on the line between the generator and the battery wound about said permanent magnet to buck the magnet flux when the current from the generator is charging the battery and to add to the magnet flux when the current from the battery flows to the generator whereby the switch remains in closed position when the bucking of the shunt coil and of the series coil overcomes the flux of the permanent magnet while the generator voltage exceeds the battery voltage, permitting the yieldably mounted armature to move the contacts to circuit-closing position and when the current reverses from the battery to the generator, the flux of the series coil is instead added to the flux of the permanent magnet to overcome the bucking of the shunt coil and operate the armature to move its contact to circuit-interrupting position.

3. A relay permitting passage of direct current from any of several generators to a storage battery and preventing reverse passage of current from the battery to any of the several generators, comprising a circuit connecting the several generators and the storage battery, a separate switch in said circuit for each generator, each separate switch being between its generator and the battery, each said switch including a pair of contacts, an armature on which one of said contacts is mounted, said armature being yieldably mounted and tending to move its contact toward circuiting-completing position, a permanent magnet normally holding said armature and its contact in circuit-interrupting position, a shunt coil across each generator and about its permanent magnet wound to normally buck the flux of its magnet to release its contact-carrying armature, a series coil on the line between each generator and the battery wound to buck the magnet flux when the current from its particular generator is charging the battery and to add to the magnet flux when the current from the battery flows to the generator whereby the switch remains in closed position when the bucking of the shunt coil overcomes the flux of the permanent magnet while the generator voltage exceeds the battery voltage, permitting the yieldably mounted armature to move the contacts to circuit-closing position, and when the current reverses from the battery to the generator, the flux of the series coil is instead added to the flux of the permanent magnet to overcome the bucking of the shunt coil and operate the armature to move its contact to circuit-interrupting position, means to somewhat reduce the flux of said shunt coil, a switch in said means, a shunt-operated electromagnet in the generator-battery circuit to close said latter switch whenever any of several generators is operating, said shunt-operated electromagnet being set to close at a predetermined voltage just below the maximum generator voltage and above the battery voltage to thereby permit any additional generator to come in the circuit only after it has reached a voltage above the battery voltage to about the maximum voltage and thus prevent hunting by any of the magnet switches.

4. A relay permitting passage of direct current from any of several generators to a storage battery and preventing reverse passage of current from the battery to any of the several generators, comprising a circuit connecting the several generators and the storage battery, a separate switch in said circuit for each generator, each separate switch being between its generator and the battery, each said switch including a pair of contacts, an armature on which one of said contacts is mounted, said armature being yieldably mounted and tending to move its contact toward circuiting-completing position, a permanent magnet normally holding said armature and its contact in circuit-interrupting position, a shunt coil across each generator and about its permanent magnet wound to normally buck the flux of its magnet to release its contact-carrying armature, a series coil on the line between each generator and the battery wound to buck the magnet flux when the current from its particular generator is charging the battery and to add to the magnet flux when the current from the battery flows to the generator whereby the switch remains in closed position when the bucking of the shunt coil overcomes the flux of the permanent magnet while the generator voltage exceeds the battery voltage, permitting the yieldably mounted armature to move the contacts to circuit-closing position, and when the current reverses from the battery to the generator, the flux of the series coil is instead added to the flux of the permanent magnet to overcome the bucking of the shunt coil and operate the armature to move its contact to circuit-interrupting position, means to somewhat reduce the flux of said shunt coil, a switch in said means, a shunt-operated electromagnet in the generator-battery circuit to close said latter switch whenever any of several generators is operating, said shunt-operated electromagnet being set to close at a predetermined voltage just below the maximum generator voltage and above the battery voltage to thereby permit any additional generator to come in the circuit only after it has reached a voltage above the battery voltage to about the maximum voltage and thus prevent hunting by any of the magnet switches, said first shunt coil flux reducing means comprising a second shunt coil wound about its permanent magnet, said second shunt coil being wound opposite to said first shunt coil about said magnet and having a considerably lesser number of turns than said first shunt coil.

JOSEPH W. ALLEN.